US012656472B2

(12) United States Patent (10) Patent No.: US 12,656,472 B2
Jonsson (45) Date of Patent: Jun. 16, 2026

(54) DETECTING PEOPLE USING A PEOPLE DETECTOR PROVIDED BY A DOORWAY

(71) Applicant: ASSA ABLOY AB, Stockholm (SE)

(72) Inventor: Tomas Jonsson, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 405 days.

(21) Appl. No.: 17/774,092

(22) PCT Filed: Nov. 4, 2020

(86) PCT No.: PCT/EP2020/080858
§ 371 (c)(1),
(2) Date: May 3, 2022

(87) PCT Pub. No.: WO2021/089571
PCT Pub. Date: May 14, 2021

(65) Prior Publication Data
US 2023/0003865 A1 Jan. 5, 2023

(30) Foreign Application Priority Data
Nov. 4, 2019 (SE) .................................... 1951257-3

(51) Int. Cl.
*G01S 13/04* (2006.01)
*G01S 7/288* (2006.01)
(Continued)

(52) U.S. Cl.
CPC .............. *G01S 13/04* (2013.01); *G01S 7/288* (2013.01); *G01S 13/62* (2013.01); *G01S 13/88* (2013.01); *G08B 13/08* (2013.01)

(58) Field of Classification Search
None
See application file for complete search history.

(56) References Cited

U.S. PATENT DOCUMENTS 7,448,548 B1 * 11/2008 Compton ................. G07C 9/00
235/382
8,225,458 B1 7/2012 Hoffberg
(Continued)

FOREIGN PATENT DOCUMENTS

CN 202003416 U * 10/2011
CN 106600777 4/2017
(Continued)

OTHER PUBLICATIONS

Choi et al. "Bi-Directional Passing People Counting System Based on IR-UWB Radar Sensors," IEEE Internet of Things Journal, 2018, vol. 5, No. 2, pp. 512-522.
(Continued)

*Primary Examiner* — Resha Desai
*Assistant Examiner* — Brandon James Henson
(74) *Attorney, Agent, or Firm* — Schwegman Lundberg & Woessner, P.A.

(57) ABSTRACT

It is provided a method for detecting people, the method being performed by a people detector provided by a doorway. The method comprises the steps of: receiving an open signal indicating that a door of the doorway is open; setting a people sensor of the people detector in an active mode based on receiving the open signal; detecting when a person passes through the doorway, using the people sensor; receiving a closed signal indicating that the door of the doorway is closed; transmitting a result of the step of detecting, wherein the step of transmitting is performed based on receiving the closed signal; and setting the people sensor in a power save mode based on receiving the closed signal.

8 Claims, 2 Drawing Sheets

(51) Int. Cl.

| | | |
|---|---|---|
| *G01S 13/62* | (2006.01) | |
| *G01S 13/88* | (2006.01) | |
| *G08B 13/08* | (2006.01) | |

(56) References Cited

U.S. PATENT DOCUMENTS

| | | | |
|---|---|---|---|
| 2007/0268145 A1 | 11/2007 | Bazakos et al. | |
| 2012/0262269 A1 | 10/2012 | Barsi | |
| 2014/0001062 A1* | 1/2014 | Hollm | B64D 11/00 |
| | | | 206/216 |

FOREIGN PATENT DOCUMENTS

| | | | | | |
|---|---|---|---|---|---|
| CN | 207409080 | | 5/2018 | | |
| CN | 108597075 | | 9/2018 | | |
| CN | 109272608 U | * | 1/2019 | | |
| CN | 106600777 B | * | 2/2019 | | |
| CN | 209182963 U | * | 7/2019 | | |
| EP | 2966480 | | 1/2016 | | |
| EP | 2966480 A1 | * | 1/2016 | | G01J 5/0025 |
| GB | 2535649 | | 8/2016 | | |
| JP | 3155201 | | 11/2009 | | |
| JP | 2014-092998 | | 5/2014 | | |
| KR | 20140011573 A | * | 1/2014 | | |
| KR | 20160007920 A | * | 1/2016 | | |
| KR | 10-2018-0053830 | | 5/2018 | | |
| KR | 10-1966026 | | 4/2019 | | |

| | | | | |
|---|---|---|---|---|
| WO | WO 2015/194118 | | 12/2015 | |
| WO | WO-2018142136 A1 | * | 8/2018 | ............ F25D 23/12 |
| WO | 2021089571 | | 5/2021 | |

OTHER PUBLICATIONS

Official Action for Sweden Patent Application No. 1951257-3, dated Apr. 17, 2020, 9 pages.

Official Action for Sweden Patent Application No. 1951257-3, dated Mar. 18, 2022, 19 pages.

International Search Report and Written Opinion for International (PCT) Patent Application No. PCT/EP2020/080858, dated Jan. 26, 2021, 15 pages.

Written Opinion of the International Preliminary Examining Authority for International (PCT) Patent Application No. PCT/EP2020/080858, dated Sep. 23, 2021, 4 pages.

International Preliminary Report on Patentability for International (PCT) Patent Application No. PCT/EP2020/080858, dated Feb. 14, 2022, 13 pages.

"International Application Serial No. PCT EP2020 080858, Response to Written Opinion filed Sep. 3, 2021 to Written Opinion mailed Jan. 26, 2021", 6 pgs.

"International Application Serial No. PCT EP2020 080858, Response to Written Opinion filed Nov. 22, 2021 to Written Opinion mailed Sep. 23, 2021", 5 pgs.

"Chinese Application Serial No. 202080075315.6, Third Office Action mailed Jul. 31, 2025", with English translation, 22 pages.

* cited by examiner

Start

<u>40</u>
Receive
open signal

<u>42</u>
Activate
person
sensor

<u>44</u>
Detect
people

<u>46</u>
Receive
closed
signal

<u>47</u>
Transmit
result

<u>48</u>
Set person
sensor in
power save

<u>1</u>

<u>60</u>
Processor

<u>62</u>
I/O

<u>64</u>

<u>67</u>

<u>66</u>

90

91

DETECTING PEOPLE USING A PEOPLE DETECTOR PROVIDED BY A DOORWAY

CROSS REFERENCE TO RELATED APPLICATIONS

This application is a national stage application under 35 U.S.C. 371 and claims the benefit of PCT Application No. PCT/EP2020/080858 having an international filing date of Nov. 4, 2020, which designated the United States, which PCT application claimed the benefit of Sweden Patent Application No. 1951257-3 filed Nov. 4, 2019, the disclosure of each of which are incorporated herein by reference.

TECHNICAL FIELD

The present disclosure relates to the field of detecting people and in particular to detecting people using a people detector provided by a doorway.

BACKGROUND

Building automation is an area in which there is a lot of progress at the moment. Both commercial properties and homes are increasingly becoming automated. The automation can e.g. be used to control indoor climate, lighting, alarm systems, etc.

Various sensors and other input devices are used as input to control the functionality of building automation systems. For instance, it is known to use $CO_2$ (carbon dioxide) sensors, indicating presence of people in a physical space, to control ventilation, cooling, lighting and office utilisation.

It would be of great benefit if there were to be a way to reliably determine the number of people in a physical space. Ideally, such a people detector should also use limited amounts of power such that it would not need to be connected to wired power.

SUMMARY

One object is to provide a people detector which reliably and with low power detects people entering or exiting a room.

According to a first aspect, it is provided a method for detecting people, the method being performed by a people detector provided by a doorway. The method comprises the steps of: receiving an open signal indicating that a door of the doorway is open; setting a people sensor of the people detector in an active mode based on receiving the open signal; detecting when a person passes through the doorway, using the people sensor; receiving a closed signal indicating that the door of the doorway is closed; transmitting a result of the step of detecting, wherein the step of transmitting is performed based on receiving the closed signal; and setting the people sensor in a power save mode based on receiving the closed signal.

The step of detecting when a person passes through the doorway may further comprise detecting a direction of the person passing through the doorway.

The result may contain a counter of all entries and a counter of all exits, since the last transmitted result.

The people sensor may comprise a pulsed coherent radar.

According to a second aspect, it is provided a people detector for detecting people. The people detector is configured to be provided by a doorway. The people detector comprises: a processor; and a people sensor; and a memory storing instructions that, when executed by the processor, cause the people detector to: receive an open signal indicating that a door of the doorway is open; set the people sensor in an active mode based on receiving the open signal; detect when a person passes through the doorway, using the people sensor; receive a closed signal indicating that the door of the doorway is closed; transmit a result of the step of detecting, based on receiving the closed signal; and set the people sensor in a power save mode based on receiving the closed signal.

The people detector may further comprise an energy harvesting device for capturing energy from door opening and/or door closing.

The instructions to detect when a person passes through the doorway may further comprise instructions that, when executed by the processor, cause the people detector to detect a direction of the person passing through the doorway.

The result may contain a counter of all entries and a counter of all exits, since the last transmitted result.

The people sensor may comprise a pulsed coherent radar.

According to a third aspect, it is provided a door closer comprising the people detector according to the second aspect.

According to a fourth aspect, it is provided a computer program for detecting people. The computer program comprises computer program code which, when run on a people detector provided by a doorway causes the people detector to: receive an open signal indicating that a door of the doorway is open; set a people sensor of the people detector in an active mode based on receiving the open signal; detect when a person passes through the doorway, using the people sensor; receive a closed signal indicating that the door of the doorway is closed; transmit a result of the step of detecting, based on receiving the closed signal; and set the people sensor in a power save mode based on receiving the closed signal.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
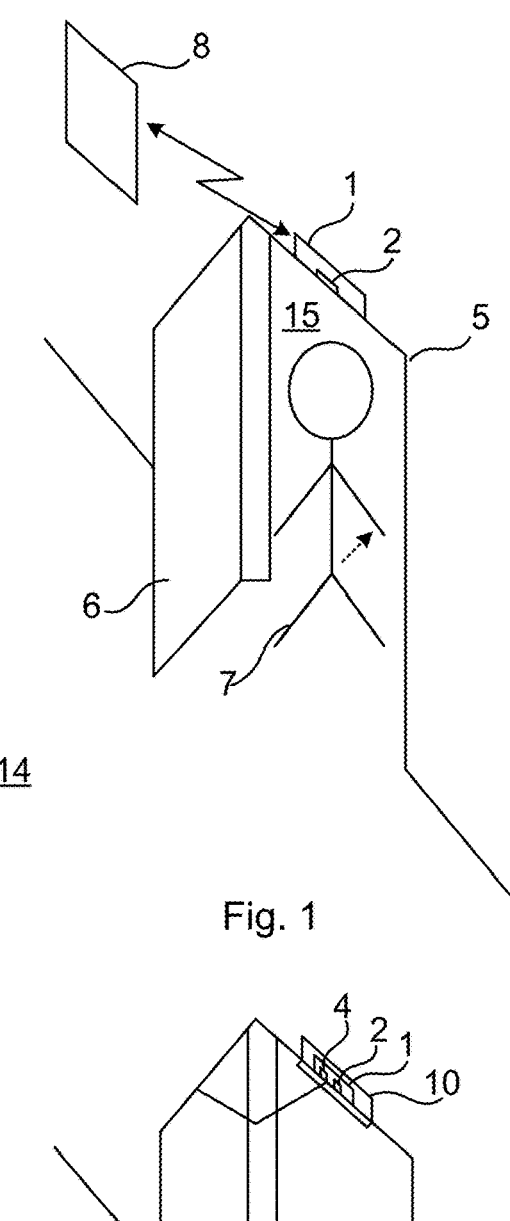
FIG. 1 is a schematic diagram illustrating an environment in which embodiments presented herein can be applied.

FIG. 1 is a schematic diagram illustrating an environment in which embodiments presented herein can be applied. Access between a first physical space 14 and a second physical space 15 is restricted by a door 6 which can be closed or open. The door 6 can be any type of door (e.g. hinged, sliding, roller) and is provided in a doorway 5 between the first physical space 14 and a second physical space 15. In order to control access in either or both direction between the physical spaces 14, 15 a lock device (not shown) can be provided to thereby selectively unlock and lock the door 6. Optionally, the status of the door 6, e.g. open or closed, can be detected by a door sensor (not shown) as known in the art per se.

A people detector 1 is provided by the doorway 5. The people detector comprises a people sensor 2 which is directed to detect any people passing through the doorway 5. In this way, the people detector can detect when someone enters the first physical space 14 from the second physical space 15 and vice versa. The people sensor 2 can e.g. be a pulsed coherent radar. By having the radar pulsed, the amount of power used by the people sensor 2 is reduced. By having the radar coherent, great accuracy is achieved. Alternatively, the people sensor can be based on any other suitable technology, e.g. infrared radar, ultrasonic signals, thermal camera, infrared camera, and/or conventional camera.

The people sensor 2 of the people detector 1 is thus capable of detecting when a person 7 moves to the first physical space 14 from the second physical space 15 (and vice versa). The number of people passing through can also be detected. This can be utilised when an intruder attempts to enter a restricted physical space by passing right after a person with legitimate access, a procedure which is also known as back tailing. Optionally, the people sensor is also capable of detecting size of the person 7 moving between the physical spaces 15, 16. The size can be indicative of age, with at least having the capability of distinguishing small children from adults.

The detection of people 7, and optionally a direction of movement, by the people sensor 2 is recorded by the people detector 1 and the people detector 1 can communicate this information to an external device 8. The external device 8 can be an alarm system, a building automation system or any other suitable device. The external device 8 can be at the same site as the people detector 1 or it can be remotely located. The external device 8 can use the people detection information to determine e.g. how many people are in the first physical space 14 and/or the second physical space 15. This information can be used by the external device 8 e.g. to control ventilation, heating, cooling and/or lighting. Alternatively or additionally, this information can be used if an emergency occurs, to know where people are located and how many people there are. When there is only one doorway to a physical space (e.g. a room, office or home), the people detector can thus be used count how many people are in the physical space at any point in time. When there are multiple doorways to a physical space, each doorway can be provided with a people detector. This enables the external device to keep track of the number of people in the physical space by detecting each time someone enters or exits through any of the doorways.

A physical space (for which the number of people is kept track of) can be any type of space where people can be present. Hence, the physical space can be any one or more of a room, a set of rooms (e.g. an office), a home, a shop, an arena, a theme park or any other commercial or residential space.

Optionally, physical spaces are arranged in a hierarchy, such that several physical spaces are represented collectively by an access zone, e.g. in an office environment. In this way, the external device 8 can keep track of the number of people in each physical space (e.g. room) and also in the combined access zone. The number of people in each access zone (based on the people counting) can be compared with the number of persons having entered using the access control system, which can thereby be used to detect the occurrence of back tailing.

Figure 2:
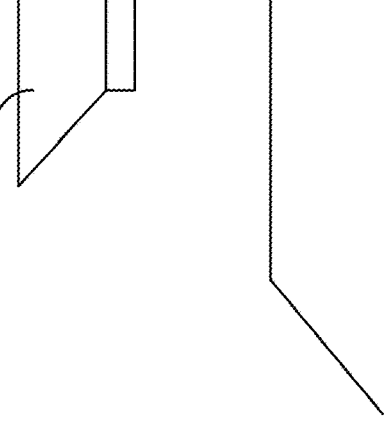
FIG. 2 is schematic diagram illustrating an embodiment in which the people detector 1 of FIG. 1 is embodied in a door closer.

FIG. 2 is schematic diagram illustrating an embodiment in which the people detector 1 of FIG. 1 is embodied in a door closer 10. The door closer 10 is any suitable device used to dampen or otherwise control the closing of the door 6. The door closer 10 can also be included in a device which also includes door opening functions. The location of a door closer 10 in a doorway 5 suits very well for placing the people detector 1 and its people sensor 2, since anyone passing through the doorway needs to pass under the door closer 10. The door closer 10 is here provided in the fixed structure around the door, such as fixed to or part of the door frame or above the door frame.

Additionally, the people detector 1 can comprise an energy harvesting module 4, which converts mechanical energy from door kinetics, (e.g. door opening/closing) to electric energy which is stored in a battery of the people detector 1. In this way, the people detector 1 needs less (or even no) externally sourced energy, such as from an energised battery or mains power.

When the people detector 1 is embodied in the door closer 10, the operation in the door closer 10 can be controlled based on people sensing. For instance, in one scenario, if all people leave a room (such as a conference room), the door closer can be set in a keep-open state to improve ventilation in the room.

In one scenario, if passthrough rate, defined as the number of persons passing through the door per time unit, exceeds a threshold value, the door closer can be set in a keep-open state to make it smoother to pass through the door. Alternatively, the door closer can be configured to close at a slower speed in this scenario. Once the passthrough rate reduces below the threshold (or below a second, lower threshold), the door closer can be reset to a normal (faster) door closing speed. The threshold(s) can be configurable.

Figures 3, 4, 5:
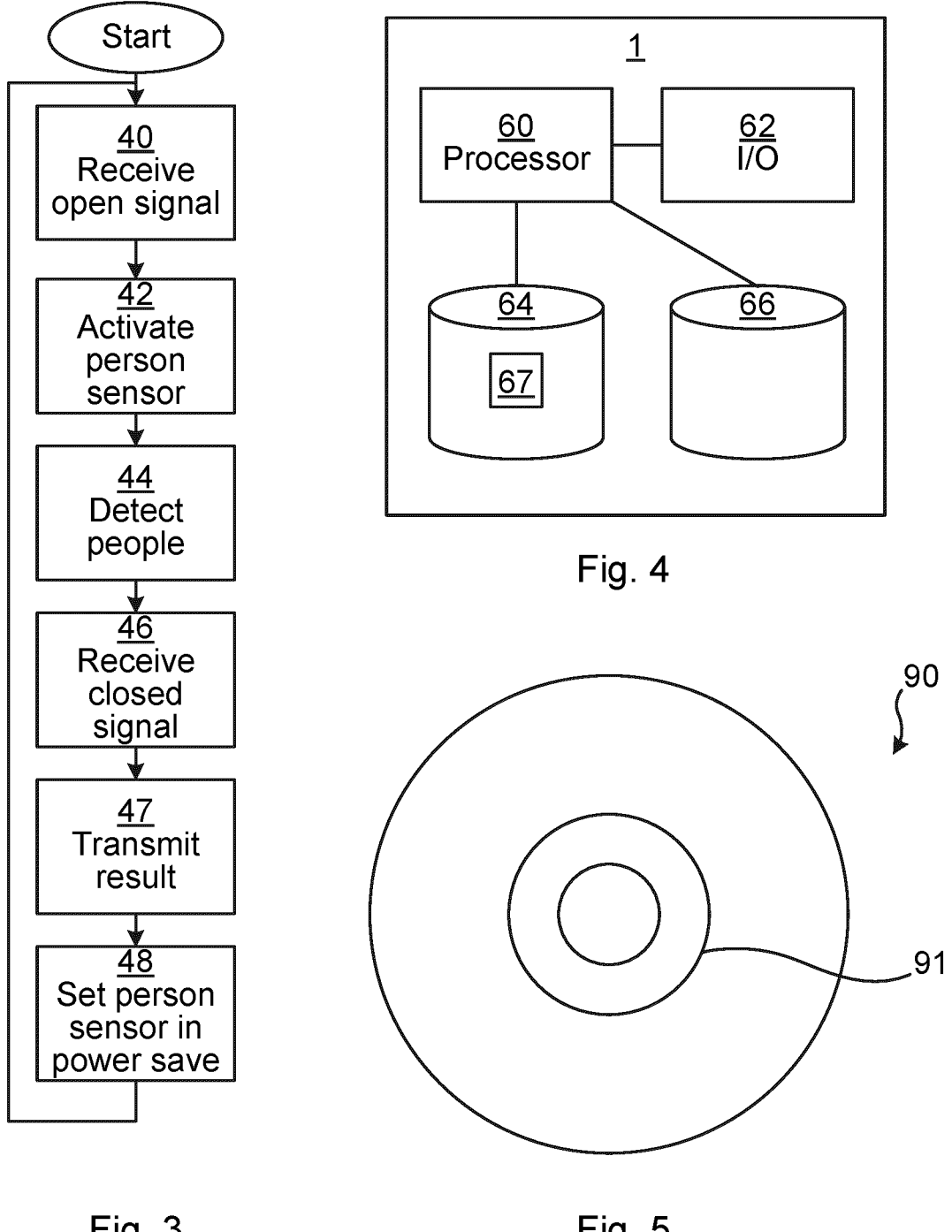
FIG. 3 is a flow chart illustrating embodiments of methods for detecting people.
FIG. 4 is a schematic diagram illustrating components of the people detector of FIGS. 1 and 2.
FIG. 5 shows one example of a computer program product comprising computer readable means.

FIG. 3 is a flow chart illustrating embodiments of methods for detecting people. The methods are performed in the people detector, which is provided by or in a doorway.

In a receive open signal step 40, the people detector receives an open signal indicating that a door of the doorway is open. The open signal can e.g. be received from a door status sensor or an electronic lock for the door.

In an activate people sensor step 42, the people detector sets the people sensor of the people detector in an active mode. This step is performed based on receiving the open signal. In other words, when the open signal is received in step 40, this step is triggered. The active mode can be a mode where the people sensor is active, e.g. in contrast to a power save mode, also known as a sleep mode.

In a detect people step 44, the people detector detects when a person passes through the doorway. This is detected using the people sensor. As explained above, the people sensor can comprise a pulsed coherent radar. In one embodiment, this step detects the direction of movement of the person through the doorway. This step can continue to detect people until a closed signal is detected in the next step. When multiple entries and/or exits are detected, the number of entries and the number of exits are counted and stored as part of a result.

In a receive closed signal step 46, the people detector receives a closed signal indicating that the door of the doorway is closed. The closed signal can e.g. be received from a door status sensor or an electronic lock for the door. As explained above, the closed signal acts as a trigger to end the people counting, since the door is closed and no more people can enter or exit.

In a transmit result step 47, the people detector transmits a result of the step of detecting to an external device. The result can e.g. be the number of people that have entered or exited the door. This transmitting is performed based on receiving the closed signal. In other words, the closed signal is a trigger for the transmission of the result. In one embodiment, the transmitted result contains a counter of all entries and a counter of all exits, since the last transmitted result. In other words, the result of all entries and exits through the doorway are respectively accumulated and transmitted once the door is closed. This makes the communication with the external device efficient, since only one signal needs to be transmitted to communicate the detection of multiple persons entering and/or exiting through the door. Alternatively, the transmitting of the result can occur regardless of the state of the door, e.g. periodically or whenever a person passes.

In a set people sensor in power save step 48, the people detector sets the people sensor in a power save mode, such as an idle state or sleep state, where power consumption is greatly reduced. This step is performed based on receiving the closed signal. In other words, when the closed signal is received, this triggers the people sensor being set in a power save mode.

Using the embodiments presented herein, the number of people passing the doorway can be counted, and also in which direction the passing occurs. The speed of movement can be detected as well as the passthrough rate. Additionally, the time between when the door is started to open until a person passes through can be detected, By controlling the power state of the people sensor based on the open/closed signals, the power requirements for the people detector are greatly reduced. In particular, if the door is normally closed, this will result in the people sensor being normally closed. This is a large difference in power consumption compared to if the people device were to be constantly active. Moreover, setting the people sensor in a power save state when the door is closed does not reduce accuracy since the door needs to be open for people to pass through, in which case the people sensor is activated. By saving this amount of power, the people detector can be powered only on battery, optionally combined with energy harvesting as described above.

By providing the people detector by the doorway, the people sensor only needs to monitor the limited space of the doorway, since people cannot pass through the structure surrounding the doorway. Compared to other people sensors in the prior art which are applied for larger spaces, the requirements of this people sensor are significantly lower. A low power, low cost, movement tuned radar can be used, thus reducing cost and complexity while providing high accuracy.

FIG. 4 is a schematic diagram illustrating components of the people detector 1 of FIGS. 1-2. It is to be noted that one or more of the mentioned components can be shared with the door closer, when the people detector 1 is embodied therein, as illustrated in FIG. 2. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 3 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The people detector 1 further comprises an I/O interface 62 for communicating with external and/or internal entities. Optionally, the I/O interface 62 also includes a user interface.

Other components of the people detector 1 are omitted in order not to obscure the concepts presented herein.

FIG. 5 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

Here now follows a list of embodiments from another perspective, enumerated with roman numerals.

i. A method for detecting people, the method being performed by a people detector provided by a doorway, the method comprising the steps of:

receiving an open signal indicating that a door of the doorway is open;

setting a people sensor of the people detector in an active mode based on receiving the open signal;

detecting when a person passes through the doorway, using the people sensor;

receiving a closed signal indicating that the door of the doorway is closed; and setting the people sensor in a power save mode based on receiving the closed signal.

ii. The method according to embodiment i, further comprising the step of:

transmitting a result of the step of detecting.

iii. The method according to embodiment ii, wherein the step of transmitting is performed based on receiving the closed signal.

iv. The method according to any one of embodiments i to iii, wherein in the people sensor comprises a pulsed coherent radar.

v. The method according to any one of the preceding embodiments, wherein the step of detecting when a person passes through the doorway further comprises detecting a direction of the person passing through the doorway.

vi. A people detector for detecting people, the people detector being configured to be provided by a doorway, the people detector comprising:

a processor;

a people sensor; and a memory storing instructions that, when executed by the processor, cause the people detector to:

receive an open signal indicating that a door of the doorway is open;

set the people sensor in an active mode based on receiving the open signal;

detect when a person passes through the doorway, using the people sensor;

receive a closed signal indicating that the door of the doorway is closed; and set the people sensor in a power save mode based on receiving the closed signal.

vii. The people detector according to embodiment vi, further comprising an energy harvesting device for capturing energy from door opening and/or door closing.

viii. The people detector according to embodiment vi or vii, further comprising instructions that, when executed by the processor, cause the people detector to transmit a result of the detecting.

ix. The people detector according to any one of embodiments vi to viii, further comprising instructions that, when executed by the processor, cause the people detector to perform the instructions to transmit based on receiving the closed signal.

x. The people detector according to any one of embodiments vi to ix, wherein the people sensor comprises a pulsed coherent radar.

xi. The people detector according to any one of embodiments vi to x, wherein the instructions to detect when a person passes through the doorway further comprise instructions that, when executed by the processor, cause the people detector to detect a direction of the person passing through the doorway.

xii. A door closer comprising the people detector according to any one of embodiments vi to xi.

xiii. A computer program for detecting people, the computer program comprising computer program code which, when run on a people detector provided by a doorway causes the people detector to:

receive an open signal indicating that a door of the doorway is open;

set a people sensor of the people detector in an active mode based on receiving the open signal;

detect when a person passes through the doorway, using the people sensor;

receive a closed signal indicating that the door of the doorway is closed; and set the people sensor in a power save mode based on receiving the closed signal.

xiv. A computer program product comprising a computer program according to embodiment xiii and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for detecting people, the method being performed by a people detector provided by a doorway, wherein the people detector comprises an energy harvesting device for capturing energy from door opening and/or door closing, the method comprising:

receiving an open signal indicating that a door of the doorway is open;

causing a people sensor of the people detector to transition from a power save mode to an active mode based on receiving the open signal;

detecting when a person passes through the doorway, using the people sensor, and detecting a direction of the person passing through the doorway;

determining both a counter of all entries since a last transmitted result and a counter of all exits since the last transmitted result, wherein at least one of: the counter of all entries since the last transmitted result comprises an accumulation of multiple entries since the last transmitted result or the counter of all exits since the last transmitted result comprises an accumulation of multiple exits since the last transmitted result;

receiving a closed signal indicating that the door of the doorway is closed;

transmitting a result of detecting, wherein transmitting is performed based on receiving the closed signal, and wherein the result contains both the counter of all entries and the counter of all exits, since the last transmitted result; and setting the people sensor in the power save mode based on receiving the closed signal.

2. The method according to claim 1, wherein in the people sensor comprises a pulsed coherent radar.

3. The method according to claim 1, further comprising converting, using the energy harvesting module, mechanical energy from door kinetics to electric energy stored in a battery of the people detector.

4. A people detector for detecting people, the people detector being configured to be provided by a doorway, the people detector comprising:

a processor;

a people sensor; and a memory storing instructions that, when executed by the processor, cause the people detector to:

receive an open signal indicating that a door of the doorway is open;

cause the people sensor to transition from a power save mode to an active mode based on receiving the open signal;

detect when a person passes through the doorway, using the people sensor, and detect a direction of the person passing through the doorway;

determine both a counter of all entries since a last transmitted result and a counter of all exits since the last transmitted result, wherein at least one of: the counter of all entries since the last transmitted result comprises an accumulation of multiple entries since the last transmitted result or the counter of all exits since the last transmitted result comprises an accumulation of multiple exits since the last transmitted result;

receive a closed signal indicating that the door of the doorway is closed;

transmit a result of detecting, based on receiving the closed signal, wherein the result contains both the counter of all entries and the counter of all exits, since the last transmitted result; and set the people sensor in the power save mode based on receiving the closed signal.

5. The people detector according to claim 4, wherein the people sensor comprises a pulsed coherent radar.

6. A door closer comprising the people detector according to claim 4.

7. The people detector according to claim 4, further comprising an energy harvesting device for capturing energy from door opening and/or door closing.

8. A non-transitory computer readable medium storing a computer program for detecting people, the computer program comprising computer program code which, when run on a people detector provided by a doorway, causes the people detector to:

receive an open signal indicating that a door of the doorway is open;

cause a people sensor of the people detector to transition from a power save mode to an active mode based on receiving the open signal;

detect when a person passes through the doorway, using the people sensor, and detect a direction of the person passing through the doorway;

determine both a counter of all entries since a last transmitted result and a counter of all exits since the last transmitted result, wherein at least one of: the counter of all entries since the last transmitted result comprises an accumulation of multiple entries since the last transmitted result or the counter of all exits since the last transmitted result comprises an accumulation of multiple exits since the last transmitted result;

receive a closed signal indicating that the door of the doorway is closed;

transmit a result of detecting, based on receiving the closed signal, wherein the result contains both the counter of all entries and the counter of all exits, since the last transmitted result; and set the people sensor in the power save mode based on receiving the closed signal.

* * * * *